US006675829B2

(12) United States Patent
Moore, Jr. et al.

(10) Patent No.: US 6,675,829 B2
(45) Date of Patent: Jan. 13, 2004

(54) DIAGNOSTIC ADAPTER FOR PRESSURE TESTING A COOLING SYSTEM

(75) Inventors: James E. Moore, Jr., Las Vegas, NV (US); Glenn Alan Hunt, Devine, TX (US)

(73) Assignee: Lincoln Industrial Corporation, St. Louis, MO (US)

( * ) Notice: Subject to any disclaimer, the term of this patent is extended or adjusted under 35 U.S.C. 154(b) by 86 days.

(21) Appl. No.: 10/059,567

(22) Filed: Jan. 29, 2002

(65) Prior Publication Data

US 2002/0121304 A1 Sep. 5, 2002

Related U.S. Application Data

(63) Continuation-in-part of application No. PCT/US00/41804, filed on Nov. 2, 2000.
(60) Provisional application No. 60/163,017, filed on Nov. 2, 1999.

(51) Int. Cl.$^7$ .......................... F16K 37/00; F16K 43/00
(52) U.S. Cl. ....................... 137/552; 137/327; 137/557; 251/148
(58) Field of Search ................. 137/557, 552, 137/327; 73/49.2, 756; 251/148, 150, 152

(56) References Cited

U.S. PATENT DOCUMENTS

| 2,677,382 A | 5/1954 | Cushing |
| 3,014,361 A | 12/1961 | Black |
| 3,100,391 A | 8/1963 | Mansfield |
| 3,255,631 A | 6/1966 | Franks |
| 4,235,100 A | 11/1980 | Branchini |
| 5,105,653 A | 4/1992 | Konter |
| D333,623 S | 3/1993 | Doyle |
| 5,193,381 A | 3/1993 | Heimann |
| 5,295,747 A | 3/1994 | Vinci |
| 5,324,114 A | 6/1994 | Vinci |
| 5,557,966 A | 9/1996 | Corry |
| 5,760,296 A | 6/1998 | Wilson |

FOREIGN PATENT DOCUMENTS

| DE | 32 30 146 A1 | 2/1984 |
| DE | 297 13 137 U1 | 1/1987 |

OTHER PUBLICATIONS

MasterTech Products, Inc. product brochure, MATCO Part# MUC004 (Sep. 17, 1997).
Autotestgeräte Leitenberger GmbH product catalog, Car Testing Equipment (1997–1998).
Autotestgeraete–Leitenberger product description, Universal Adapter UA 1–4 with hand wheel (Jul. 5, 2001).
Autotestgeraete–Leitenberger product description, Universal Adapter UA 11–14 with levers (Jul. 5, 2001).
Autotestgeraete–Leitenberger product description, Universal Adapter UA 50 general (Jul. 5, 2001).
Autotestgeraete–Leitenberger product description, Universal Adapter UA60j Japanese (Jul. 5, 2001).
Cooling System Analyser Instruction Manual (circa 1998).

*Primary Examiner*—A. Michael Chambers
(74) *Attorney, Agent, or Firm*—Senniger, Powers, Leavitt & Roedel

(57) ABSTRACT

A modular cooling system adapter for coupling to an orifice and applying pressure from a source of pressurized gas. The adapter includes a universal cooling orifice fitting for attaching the device to cooling system orifices of various sizes and configurations. The universal fitting preferably includes a plurality of steps having outer axially extending surfaces disposed at a slight negative angle to a plane parallel to the axial direction. The adapter may include a pressure adapter for coupling to a source of pressurized gas, such that the pressure adapter can be interchanged with other diagnostic tools including a valve assembly, a valve assembly incorporating a temperature probe and gauge and/or a pressure gauge. Additionally, the cooling system adapter is fully modular in that it allows quick disassembly for replacement of components and interchangeability of diagnostic tools.

22 Claims, 7 Drawing Sheets

DIAGNOSTIC ADAPTER FOR PRESSURE TESTING A COOLING SYSTEM

RELATED APPLICATIONS

This application is a continuation-in-part of PCT/US00/41804, filed Nov. 2, 2000, which is based on U.S. Provisional Application No. 60/163,017, filed Nov. 2, 1999, now closed.

FIELD OF THE INVENTION

The invention relates generally to cooling system pressure testing devices, and more specifically to an apparatus for monitoring the internal pressure and preferably temperature of a cooling system that uses liquid coolant to facilitate temperature reduction.

BACKGROUND OF THE INVENTION

Engines, such as those in motorcycles, automobiles, and other motive vehicles, typically utilize coolant systems with liquid coolant to facilitate temperature reduction. A variety of potential problems are associated with such cooling systems. In order to diagnose these problems, it is useful to measure the pressure of the cooling system, as well as the temperature of the coolant itself, during a running cycle. In this regard, it is further advantageous for the system to have the capability to pressurize the cooling system in order to obtain these readings and locate any leaks in the system. Various apparatus are known for testing such systems by pressurization in order to detect leaks therein. Each of these apparatus, however, has shortcoming in either design or operation.

U.S. Pat. No. 1,776,170 to Thimblethorpe discloses a cap-like device that fits over the opening of a radiator and includes a temperature sensor and a level sensor for indicating the level and temperature of the liquid in the radiator of an automotive vehicle.

U.S. Pat. No. 3,255,631 to Franks discloses a pressure/temperature indicating apparatus attached to a radiator cap with a sealing mechanism. The sealing mechanism includes a spring that bears against a metal washer, serving to seal the radiator with a rubber washer.

U.S. Pat. No. 3,100,391 to Mansfield discloses a pressure and temperature indicator that is adapted to fit over a radiator cap of an automotive cooling system. The radiator cooling system may be pressurized using a pump or a valve stem and pressurized air.

U.S. Pat. No. 4,702,620 to Ford discloses an electronic thermostat having a temperature sensor, which is inserted through a cap-like device adapted to fit over the opening of the radiator. The system is designed to monitor the temperature of the coolant and the radiator over time.

U.S. Pat. No. 5,324,114 to Vinci discloses a device for monitoring temperature and pressure of a liquid coolant in a cooling system. Vinci includes a particularized sealant that seals around the probes of a needle from a temperature or pressure probe and reseals itself upon removal of the needle.

U.S. Pat. No. 5,557,966 to Corry and U.S. Pat. No. 5,760,296 to Wilson disclose cooling system pressure testing devices that utilize bladders that may be inserted into an inlet in a deflated state and then inflated to couple the device to the inlet.

Systems available in the market typically include a pressure probe assembly and a plurality of adapter cap fittings designed to suit a variety of radiator neck configurations and sizes. Typically, such test systems require 25–30 different fittings in order to provide a system that may be utilized with the broad range of vehicles on the market. In use, an appropriately sized adapter cap fitting is selected to fit the radiator neck size and configuration of the cooling system being tested. The cap fitting is secured to the neck of the radiator, and a pressure probe and gas compressor coupled to the cap fitting. A typical pressure probe includes a pressure gauge, and has an outlet connectable to a selected one of the adapter cap fittings, the fitting also being adapted to receive pressurized gas from a compressor. The cooling system is then pressurized and the pressure measured.

Kits of this type are typically expensive and complex as they consist of a large number of parts, usually including a plurality of adapter cap fittings. Further, the range of cap fittings available generally does not cover all possible radiator neck configurations and sizes. Additionally, as these cap fittings are loose parts of a kit, they are often lost or misplaced.

Another attempt to simplify pressure-testing devices is the Uni-Cap Universal Cap Adapter, in which a single-size pressure probe adapter cup is permanently affixed to an expandable radiator orifice fitting. Although fitting a wide range of radiator necks, the principal disadvantage of the Uni-Cap device is that it can only be used with specific commercially available pressure probe assemblies sized to mate with the permanently affixed adapter cup. This limitation reduces the flexibility of the Uni-Cap device, particularly with respect to pressure probes that do not fit the permanently affixed adapter cup. Therefore, a need exists for a truly cooling system orifice adapter that fits a wide range of radiator necks and is not limited by commercially available pressure probes.

Another disadvantage of the Uni-Cap design is the difficulty in repair or replacement of its components. Since the radiator cup is welded or brazed to the internal shaft, the Uni-Cap cannot be disassembled, or its components replaced without damaging the device. The universal radiator orifice fitting, for example, cannot be replaced if damaged by scale build-up in the radiator neck, improper installation, or general wear and tear. Ultimately, if any component of the Uni-Cap is damaged, the entire assembly must be rebuilt or replaced. Both alternatives are generally more costly than component replacement.

Other universal-type adapters are marketed by companies such as Autotestgerate Leitenberger GmbH, which markets adapters which similarly include a tapered rubber plug. One such device, which includes a conical rubber plug, is disclosed, for example, in German Application DE 32 30 146 A1. Other devices marketed by Autotestgerate Leitenberger GmbH include a stepped rubber plug, or a conical plug having a plurality of spaced, thin rings encircling the cone and distributed along the length of the cone. Autotestgerate Leitenberger GmbH also markets a universal-type device which includes a cylindrical plug which seats along an inner surface of the radiator to seal the device to the radiator. The latter device also includes a pair of brackets which clamp around surfaces of the radiator orifice. Similar devices are marketed by at least one Taiwanese company.

In view of the generally conical or straight cylindrical structure of each of the devices, however, even when properly placed on a vehicle, the plug of the adapter can be ejected from the radiator opening when high pressures are developed within the radiator. Such forcible ejection not only prevents proper testing of the vehicle, it can also be extremely dangerous, causing damage to both the vehicle and the user.

OBJECTS OF THE INVENTION

An object of the present invention is to provide a diagnostic tool for measuring cooling system temperature and/or pressure, such that the tool may be conveniently utilized in a variety of applications without requiring assembly or disassembly of the diagnostic tool itself. A related object of the invention is to provide such a diagnostic tool that may be utilized to apply pressurized gas from a hand pump or the like, or directly from a shop source.

Another object of the invention is to provide a modular universal pressure and temperature diagnostic tool that affords easy repair and replacement of parts that are susceptible to damage and heavy wear during normal use.

A further object of the invention is to provide a single adapter that may be utilized in a broad range of vehicle applications, eliminating the need for multiple adapters in standard testing systems.

A related object is to provide an adapter which can be directly connected to standard testing systems currently available on the market, but that is not limited to use with standard testing systems or a single radiator cup size.

A collateral object of the invention is to provide a device that may be efficiently manufactured and repaired at a relatively low cost.

Another important object is to provide a device that can consistently be safely used without collateral damage to the vehicle, other property, observers or the user. It is a more specific object to provide such a device which will not be ejected from the cooling system orifice during high pressure use.

The present invention overcomes the disadvantages of the prior art. These and other objects and advantages of the present invention, as well as additional inventive features, will be apparent from the description of the invention provided herein.

BRIEF SUMMARY OF THE INVENTION

The invention provides a modular cooling system orifice adapter that may be utilized as a diagnostic tool for evaluating a cooling system. In one embodiment, the device includes a relatively standard size orifice cup which is adapted to mate with a number of pressure testers available on the market. In another embodiment, the adapter includes a valve assembly having a shuttle valve that may be coupled to a source of pressurized gas, preferably a hand held pump. The shuttle valve is slidably received within a valve body that is coupled to a hollow shaft that may be placed in fluid communication with the cooling system. The shuttle valve may be used to selectively apply compressed gas to the cooling system by moving the shuttle valve between an open position wherein the source of compressed gas is in fluid communication with the hollow shaft and therefore the cooling system, and a closed position wherein there is no such fluid communication.

The valve assembly also includes a pressure gauge, which is preferably coupled to the shuttle valve to measure the pressure of the system. A temperature gauge may also be coupled to the valve body such that it is in fluid communication with the hollow shaft for determining the temperature within the system.

The valve assembly or cup is preferably coupled to cooling system by a universal fitting, which allows the adapter to be utilized with many sizes and shapes of cooling system openings. The universal fitting, in the form of a rubber adapter, has an exterior surface that generally decreases in diameter, preferably consisting of a plurality of round steps. The hollow shaft extends through the universal fitting and includes an enlarged head that is disposed at the small end of the universal fitting. A plate is disposed along the shaft at the opposite end of the universal fitting as is a compression device that may be actuated to draw the head and plate toward one another so as to axially compress the universal fitting, in turn causing the steps to bulge and seal against the opening in the radiator or the like after the adapter is partially inserted into the opening. The upper edges of the substantially axially extending walls of the steps of the universal fitting are preferably angled radially inward to minimize any possibility of the fitting separating from the cooling system orifice. In this way, the lower edge of the vertical step protrudes further outward than the upper, such that sufficient interference is created to typically prevent the lower edge of the vertical step from separating from the cooling system orifice when it is axially compressed and a pressure applied to the cooling system.

Preferably, the adapter is modular such that it may be readily disassembled for replacement of worn out or damaged components. In this regard, the hollow shaft is preferably threaded at one end. In this way, a compression device, such as a threaded knob may be simply rotated along the shaft threads to axially compress the universal fitting. Additionally, the valve or cup assembly may be coupled to the device by threads that mate with the threaded end of the shaft. A seal or gasket disposed between the shaft and the valve assembly or cup provides a sealed connection between the interior valve assembly or cup and the hollow interior of the shaft. Those of skill in the art will appreciate that the invention so provides an adapter that may be utilized as a practical and economical diagnostic tool in a large number of applications.

It will further be appreciated that this modular arrangement may also be utilized with other pressure testing devices available on the market by including the standardized radiator cup assembly in place of the valve assembly. In this way, the invention provides a repairable, and therefore practical and economical alternative to the use of multiple adapters typically provided with standard pressure testing devices.

These and other features and advantages of the invention will be more readily apparent upon reading the following description of a preferred exemplary embodiment of the invention and upon reference to the accompanying drawings wherein:

DESCRIPTION OF THE PREFERRED EMBODIMENTS

Figure 1:
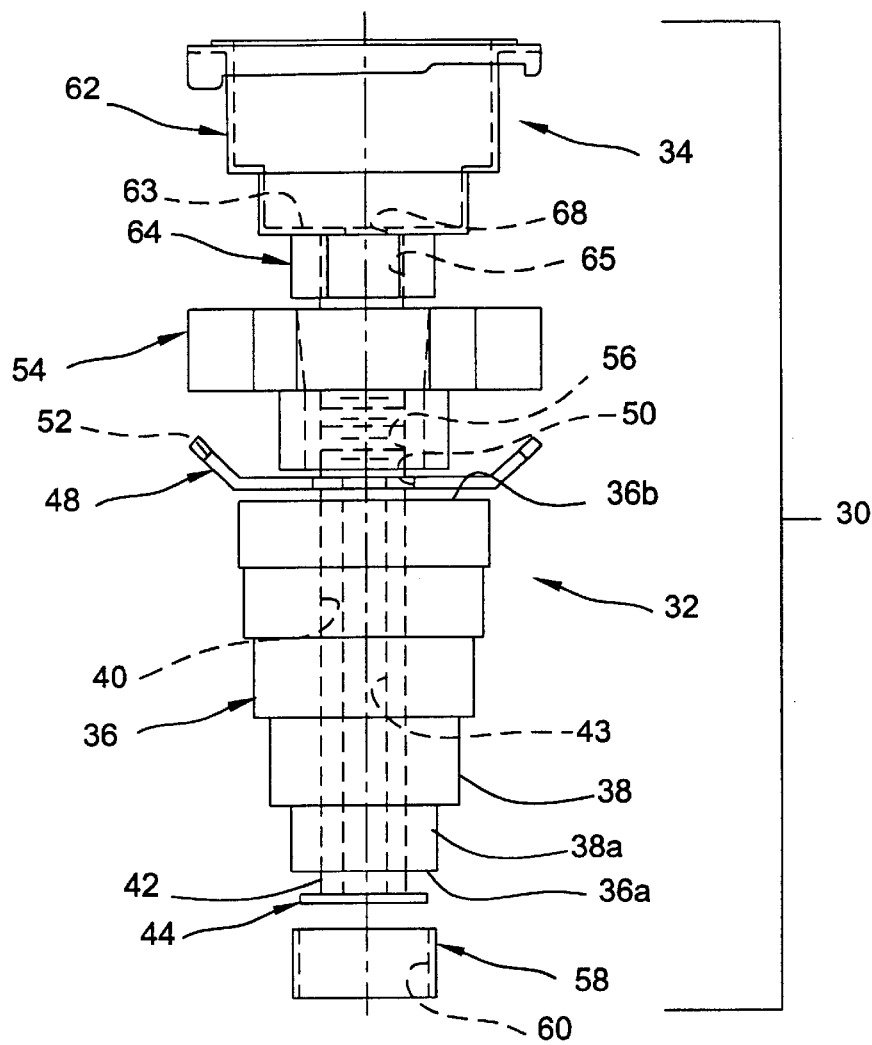
FIG. 1 is a side elevational view of a cooling system orifice adapter assembly constructed according to teachings of the invention.
Figure 2:
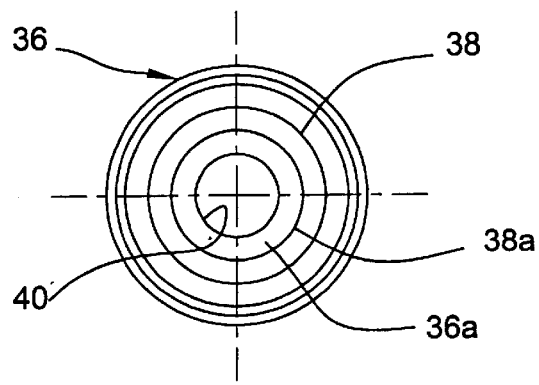
FIG. 2 is a bottom view of the universal fitting of FIG. 1.

Turning now to the drawings, FIG. 1 illustrates a side elevational view of a universal modular cooling system orifice adapter 30 constructed in accordance with teachings of the invention. According to an important feature of the invention, the adapter is of a modular assembly. This modular assembly allows a user of the invention to quickly disassemble the unit for repair or replacement of any individual component, and to easily reconfigure the device for use according to its various embodiments described herein. Moreover, disassembly and reassembly of the invention requires merely unscrewing the threaded portions of the device.

The adapter 30 includes a coupling assembly 32 whereby the adapter may be coupled to a broad range of sizes of radiator necks (not shown) of the cooling systems of a broad range of vehicles, and also to a pressure adapter 34 that allows the adapter 30 to be utilized with a broad range of cooling system testers (not shown) currently on the market. While the invention will be described with regard to the adapter 30 being coupled to a radiator neck, it will be appreciated that the adapter 30 may alternately be coupled to an opening of an overflow tank or other appropriate orifice.

The coupling assembly 32 includes a universal fitting 36 which is preferably formed of a rubber material with a durometer sufficient to withstand the axial and radial forces exerted on the fitting 36, as well as temperatures, pressures, and other environmental stresses while providing a durable, reusable device. The universal fitting includes an exterior surface having a diameter that increases from the bottom to the top, that is, from the distal end to the proximal end. The illustrated design includes a number of steps 38 ranging from small to relatively large, each presenting a consecutively larger outer diameter. In operation, the universal fitting 36 is advanced into the radiator neck of the cooling system as deeply as possible, such that the largest diameter step 38 with a diameter smaller than the diameter of the radiator neck is disposed within the inner diameter of the radiator neck. The universal fitting 36 is then compressed axially in order to cause the universal fitting 36 to bulge outward to a greater diameter to contact and seal against the inner diameter of the radiator neck. It will be appreciated that as the universal fitting 36 continues to be axially compressed, the force exerted by the universal fitting against the inner diameter of the radiator neck, i.e., the retention force, increases.

In order to provide this axial compression of the universal fitting 36, the universal fitting is provided with a bore 40, which extends axially through the fitting 36. A hollow shaft 42 having an enlarged head portion 44 and a central axial bore 43 is disposed within the axial bore 40 of the universal fitting 36. As may be seen in FIG. 1, the enlarged head portion 44 of the shaft is disposed subjacent the smallest diameter step 38a of the fitting 36. It will thus be appreciated that the enlarged head portion 44 of the shaft 42 exerts an upward axial force against the lowermost surface 36a of the universal fitting 36 as the head portion is drawn upward.

Figure 7:
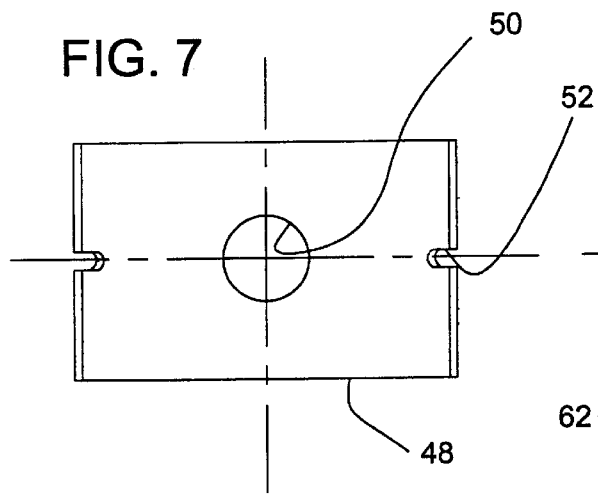
FIG. 7 is a plan view of the pressure plate of FIG. 1.
Figure 8:
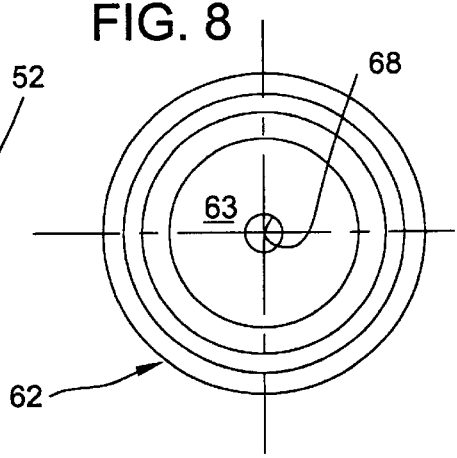
FIG. 8 is a plan view of the radiator cup of FIG. 1.
Figure 9:
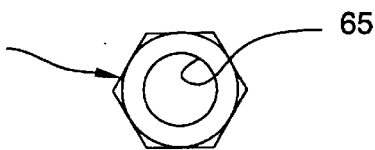
FIG. 9 is a plan view of the nut of FIG. 1.

In order to provide a corresponding exertion of force on the uppermost surface 36b of the universal fitting 36, a pressure plate or tie down plate 48 is provided. As may be seen in FIG. 7, the pressure plate 48 includes a central bore 50, which freely receives the shaft 42. Thus, forcing the head portion 44 of the shaft 42 and the pressure plate 48 toward each other produces an axial force on the universal fitting 36, in turn causing the steps 38 to bulge outward.

Figure 3:
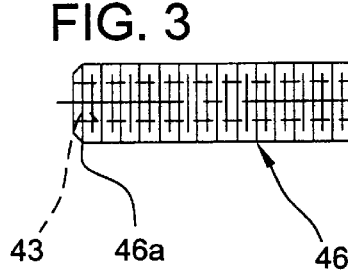
FIG. 3 is an elevational view of the shaft of FIG. 1.
Figure 4:
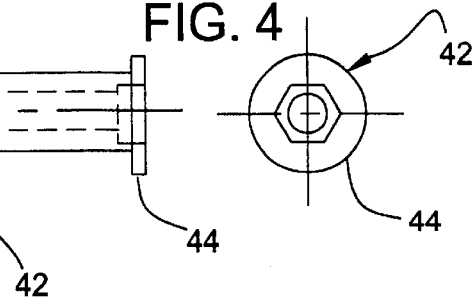
FIG. 4 is a bottom view of the head of the shaft of FIGS. 1 and 3.
Figure 5:
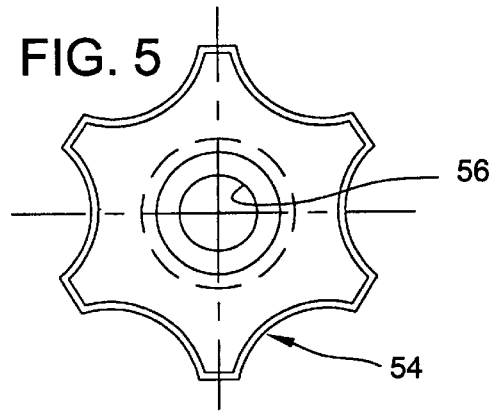
FIG. 5 is a plan view of the knob of FIG. 1.
Figure 6:
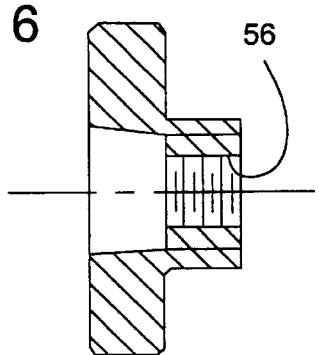
FIG. 6 is a cross-sectional view of the knob of FIGS. 1 and 5.

To provide this axial force, the adapter 30 is provided with a compression device. In the embodiment illustrated, the shaft 42 is provided with a threaded length 46 along its external surface (see FIG. 3) along which a knob 54 having a mating, threaded inner bore 56 extending axially therethrough is disposed along the shaft 42 (see FIGS. 1, 5–6). In this way, once the user inserts the universal fitting 36 into the radiator neck or other aperture to a desired depth, the user tightens the knob 54 on the shaft 42 to exert a downward force on the pressure plate 48, and a corresponding upward force on the universal fitting 36 by way of the head portion 44 of the shaft, to axially compress the fitting 36.

Figure 14:
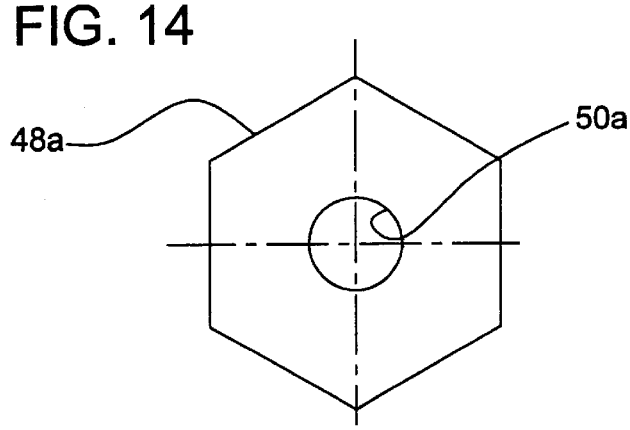
FIG. 14 is a plan view of an alternate embodiment of the pressure plate of FIG. 7.

The pressure plate 48 may be of any appropriate design, provided that adequate surface is provided to permit the application of force to the universal fitting 36. In this regard, an alternate embodiment 48a of the pressure plate is illustrated in FIG. 14. The pressure plate 48a is a flat washer-like design with a central opening 50a for receiving the shaft 42.

A separate support ring 58 having an inner bore 60 with a diameter substantially equal to the outer diameter of the smallest diameter step 38a is preferably provided. The support ring 58 is particularly useful in applications where the larger diameter steps 38 are utilized to seal the radiator neck. When disposed in this way, the support ring 58 provides additional support to the thinnest portion of the universal fitting 36 and minimizes any opportunity for the universal fitting 36 to disengage the head portion 44 of the shaft 42 and slide over the head portion 44 when the universal fitting 36 is axially compressed to an excessive degree.

The adapter 30 may additionally be provided with a second coupling mechanism for use in conjunction with the expansion of the universal fitting 36. In this regard, the pressure plate 48 may be provided with one or more slots 52 for receiving a chain or the like (not shown) to further mechanically couple the adapter 30 to the radiator neck. It will be appreciated by those of skill in the art that the chain-coupling structure is not necessary to the operation of the adapter 30, nor is it necessary with regard to the sealing of the adapter to the radiator neck. Rather, it is intended and operates merely as a back-up, precautionary measure to enhance safety when operating the adapter 30.

Figure 16:
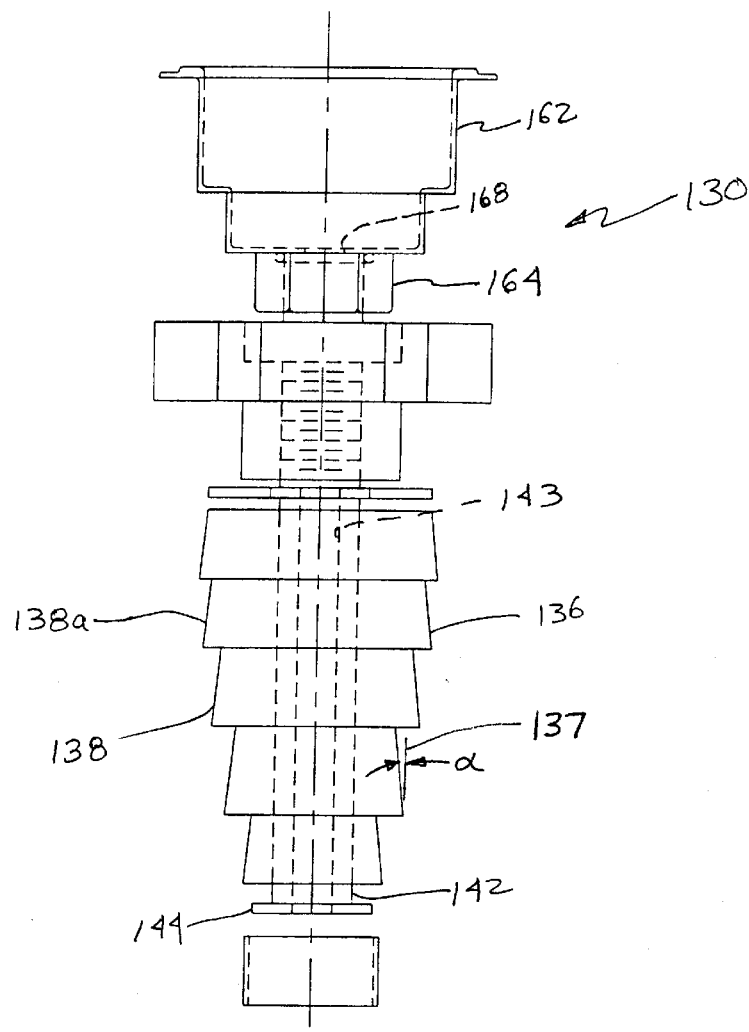
FIG. 16 is a side elevational view of a third embodiment of the cooling system orifice adapter assembly constructed according to teachings of the invention.
Figure 17:
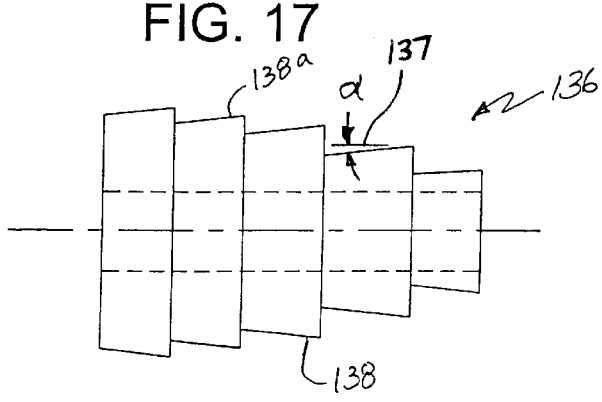
FIG. 17 is a side elevational view of the universal fitting of FIG. 16.
Figure 18:
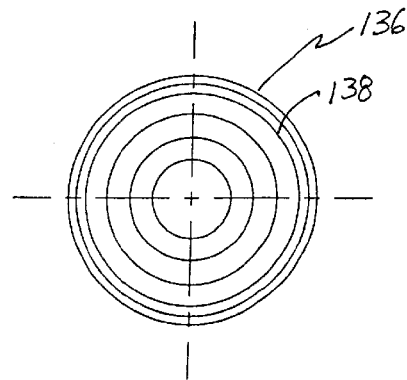
FIG. 18 is an end view of the universal fitting of FIGS. 16 and 17.

An alternate embodiment of universal fitting 136 is shown in FIGS. 16–18. In this embodiment, in order to minimize any opportunity for the universal fitting 136, and, according, the adapter 130 to disengage from the radiator orifice when air pressure is applied to the radiator system, the substantially axially extending portions 138a of the steps 138 of the fitting 136 are preferably disposed at a slight negative angle α relative to normal or a line 137 disposed parallel to the axis of fitting 136. The angle α is preferably large enough to allow the desired step 138 of the fitting 136 to be properly advanced into and placed within the radiator orifice.

By way of example only, the steps 138 of the currently preferred embodiment of the radiator adapter fitting 136 are on the order of 1.5 inches in maximum diameter by 0.4 inches tall (39 mm maximum diameter by 11 mm tall), 1.5 inches maximum diameter by 0.4 inches tall (37 mm maximum diameter by 11 mm tall), 1.3 inches maximum diameter by 0.5 inches tall (34 mm maximum diameter by 13 mm tall), 1.1 inches maximum diameter by 0.6 inches tall (27 mm maximum diameter by 14 mm tall), and 0.8 inches maximum diameter by 0.5 inches tall (20 mm maximum diameter by 11 mm tall). In this embodiment, it has been determined that the preferred typical angle α is on the order of 6° from normal. It will be appreciated, however, that this angle α could vary from 4° to 8°, although other angles are envisioned. It will further be appreciated that the steps themselves may have an alternate shape. For example, the substantially axially extending 138a wall of the universal fitting 136 may have a slight concavity, which likewise includes an angle α from normal.

Returning now to FIG. 1, to couple the adapter 30 to a source of pressurized gas, a pressure adapter 62 is removably disposed at the proximal end of the hollow shaft 42. Significantly, a threaded segment 46a is provided at the end of the hollow shaft 42, which mates with a threaded portion of the pressure adapter 62. In the embodiment illustrated, the threaded segment 46a is contiguous with the externally threaded length 46. It will be appreciated, however, that the pressure adapter 62 could alternately include an externally threaded portion which mates with an internally threaded segment at the proximal end of the hollow shaft bore 43.

To allow the cooling system orifice adapter 30 to be coupled to most cooling system testers currently on the market for application of compressed gas and pressure testing, the pressure adapter may be in the form of a standardized radiator cup 62. Significantly, the radiator cup 62 is removably coupled to the hollow shaft 42 by way of a coupler such as a brass nut 64, which is welded to the lower surface of the radiator cup 62. The internal threads within the primary bore 65 of the brass nut 64 are sized to receive the threaded segment 46a at the end of the shaft 42. In this way, the cup 62 may be readily removed from the shaft 42, the adapter 30 disassembled, and any of the modular components replaced.

The bottom 63 of the radiator cup 62 includes a pressure passage, here, a center bore 68. Thus, an axial passageway is formed in the universal adapter 30 by way of center bore 68 of the radiator cup 62, the primary bore 65 of the brass nut 64, and the center bore 43 of the hollow shaft 42. Those of skill in the art will appreciate that as a cooling system tester is coupled to the radiator cup 62, pressure may be applied to the cooling system through the passageway to test the cooling system.

Figure 19:
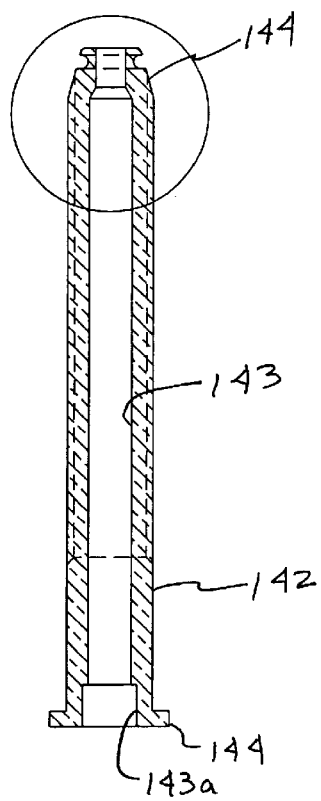
FIG. 19 is a side elevational view of the shaft of FIG. 16.
Figure 21:
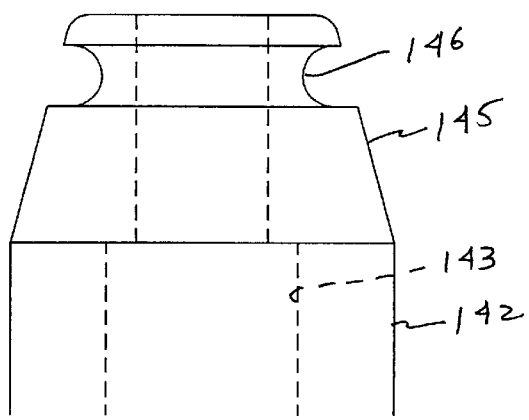
FIG. 21 is an enlarged side view of the opposite end of the shaft of FIGS. 16, 19, and 20.

Side elevational views of the shaft 142 of the embodiment of FIGS. 16–21 are shown in FIGS. 19 and 21. In order to provide a sealed pressure passage 168 from the cup 162 through the shaft center bore 143, the shaft 142 includes a tapered end portion 145 with an annular channel 146 for receiving an annular seal, such as an O-ring. Once assembled, the annular seal is compressed between the shaft 142 annular channel 146 and the radiator cup 162/brass nut 164 to seal gas passage between the components.

Figure 20:
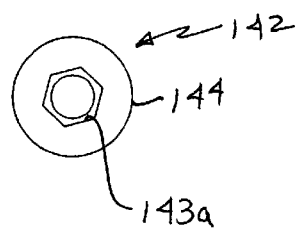
FIG. 20 is an end view of the shaft of FIGS. 16 and 19.

Further, in order to facilitate repair of the adapter 130, the end of the shaft 142 displaying the enlarged head portion 144 may include structure for engagement by a tool. For example, the lowermost portion of the axial bore 143 of the shaft 142 may include recessed structure 143a for engagement by an Allen wrench, as shown in FIG. 20. In this way, the operator could utilize an Allen wrench engaging the shaft opening 143a and a wrench engaging the nut 164 disposed below the radiator cup 162 to readily disassemble the orifice adapter 130 for repair.

Figure 10:
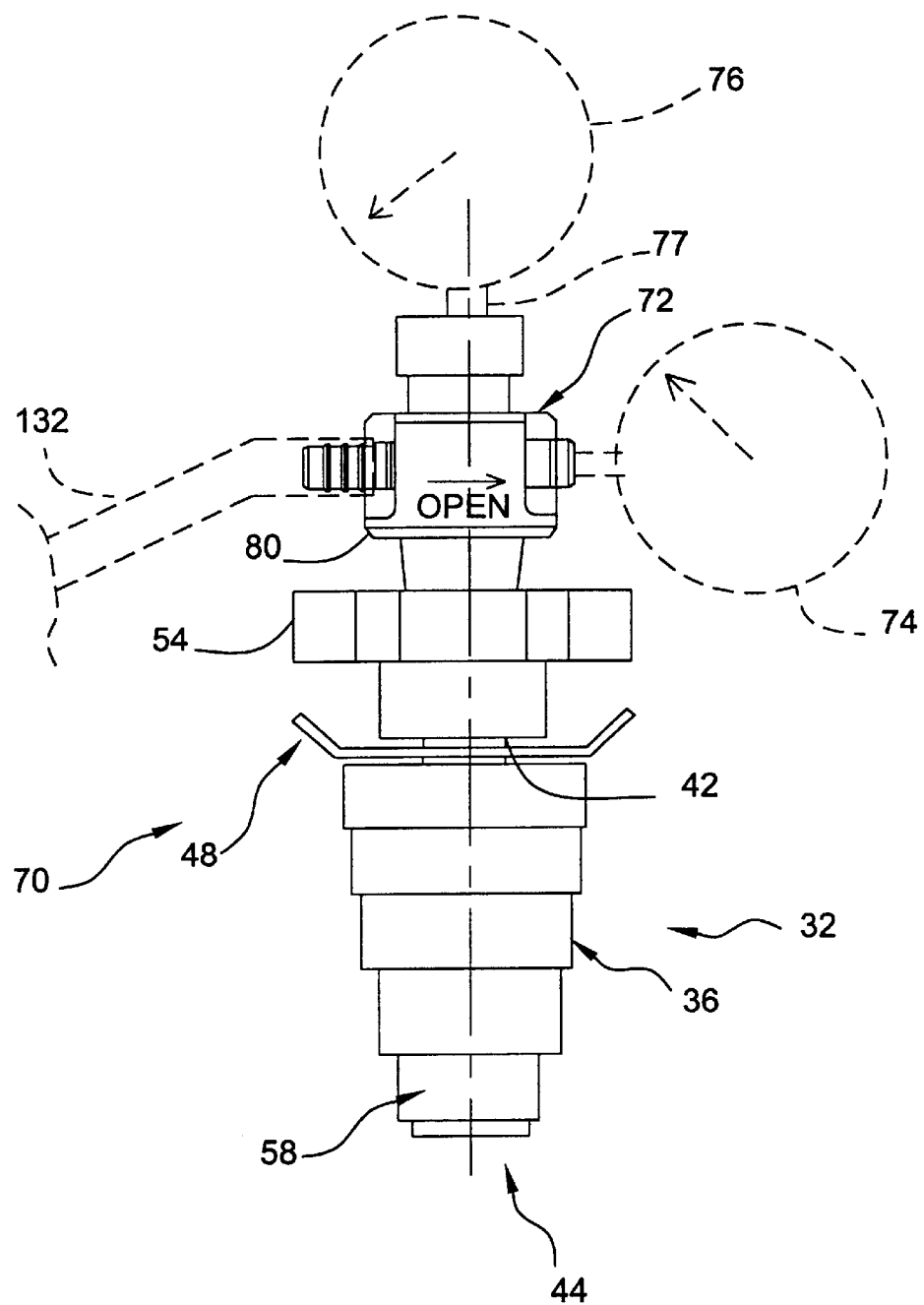
FIG. 10 is a side elevational view of an alternate embodiment of the cooling system orifice adapter including a tester.

Another alternate embodiment of the invention is shown in FIG. 10. This adapter assembly 70 is designed to provide a mechanism by which pressure may be applied to the cooling system and pressure and temperature measured directly by gauges 74, 76 coupled to the adapter assembly 70. It will be appreciated by those of skill in the art, however, that a device constructed in accordance with teachings of the invention may include either, both or neither of the pressure and temperature gauges. In an arrangement that does not include a pressure gauge, however, the operator would typically utilize a pressure-testing device that would include a pressure gauge in monitoring cooling system pressures.

In this embodiment, the pressure adapter is in the form of a valve assembly 72 that facilitates direct application of pressure from a pressure source such as a hand pump, a compressor or shop air. An appropriate hand pump is disclosed, for example, in U.S. Pat. Nos. 4,775,302, 4,806,084, 4,954,054, 5,205,726, 5,217,354, or 5,362,214, which are hereby incorporated by reference. The adapter assembly 70 allows direct measurement of pressure and temperature within the cooling system by means of directly coupled pressure and temperature gauges 74, 76, respectively. The coupling system 32 of the adapter assembly 70 is identical to that of the first embodiment illustrated in FIG. 1, and, accordingly, the reference numerals utilized with regard to the coupling assembly in this embodiment are identical to those utilized in the first embodiment.

Figure 11:
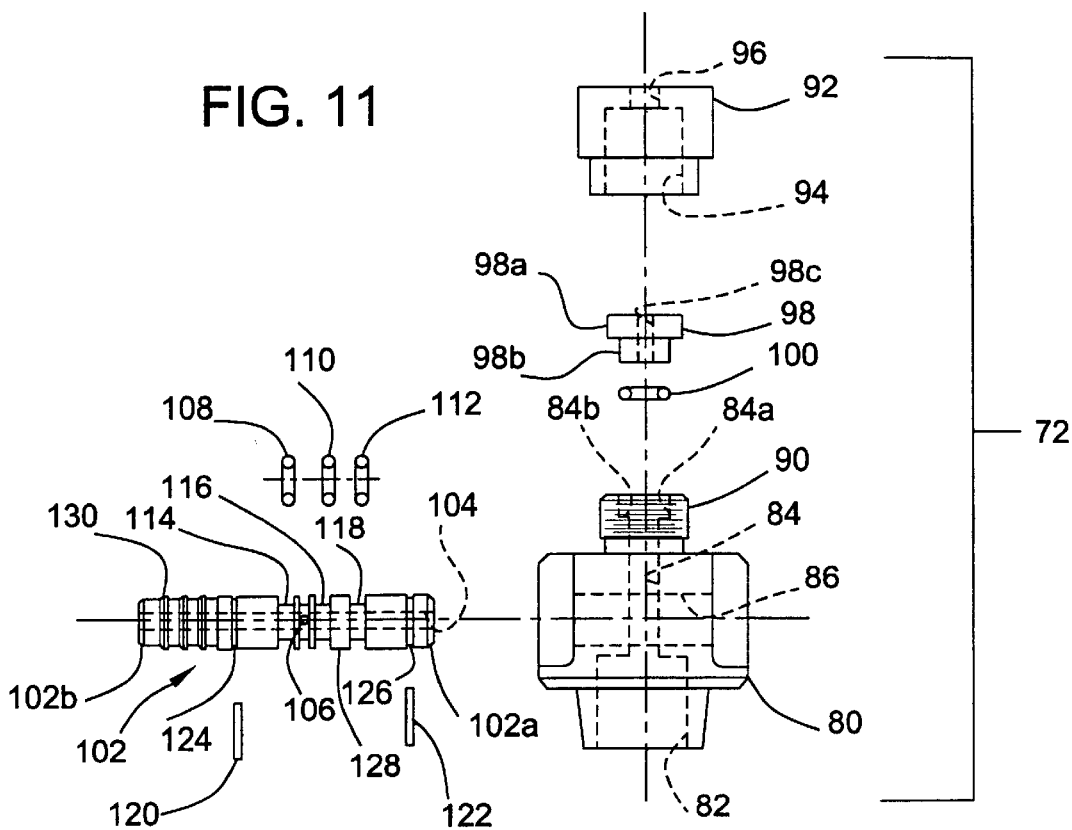
FIG. 11 is an exploded elevational view of the valve assembly of FIG. 10.

Referring now to FIG. 11, there is shown an exploded view of the valve assembly 72 of this embodiment. The valve assembly comprises a valve body 80 which includes an internally threaded primary bore 82 for coupling the valve assembly to the threaded segment 46a at the proximal end of the threaded shaft 42 of the adapter assembly 70. In order to provide connections to the pressure and temperature gauges 74, 76, and to facilitate the application of pressure from a pressure source, the valve body further includes bores 84, 86, and coupling pressure passage 88 (most clearly visible in FIG. 13). Bore 84 couples the threaded bore 82 to a threaded shaft 90 extending from the upper surface of the valve body 80, the bore 84 providing an open channel between the threaded shaft 90 and the threaded bore 82.

In order to couple the temperature gauge 76 to the valve body 80, a knob 92 is provided which includes an internally threaded bore 94 for receiving the threaded shaft 90. The knob 92 further includes a through opening 96, which receives a temperature probe 77 and gauge 76. To seal the temperature probe 77 in the valve assembly 72, a stepped compression bushing 98 and O-ring 100 are provided. Preferably, the knob 92 and compression bushing 98 are formed of brass, while the O-ring 100 may be a standard rubber O-ring of an appropriate size. As may be seen in FIG. 11, the larger outer peripheral surface 98a of the compression bushing is sized to be received in the threaded bore 94 of the knob 92, while the smaller outer peripheral surface 98b of the compression bushing 98 is sized to be received in an enlarged portion 84a of the bore 84. The compression bushing 98 further includes a bore 98c extending axially therethrough.

In assembly, the temperature probe 77 is assembled into the through opening 96 and threaded bore 94 of the knob 92, through the inner bore or internal passage 98c of the compression bushing 98. The temperature probe 77 further extends through the O-ring 100 as the temperature gauge 76 is assembled into the valve body 80. The O-ring 100 about the temperature probe 77 is disposed within the enlarged portion 84a of the bore 84, and seats against the flange 84b. As the knob 92 is threaded downward on the threaded shaft 90, the compression bushing exerts a force on the O-ring 100 which compresses the O-ring to seal against the temperature probe 77. It will thus be appreciated that the temperature probe 77 so coupled to the valve assembly 72 will effectively measure the temperature within the cooling system by way of the bore 84 and the center bore 43 of shaft 42.

Figure 12:
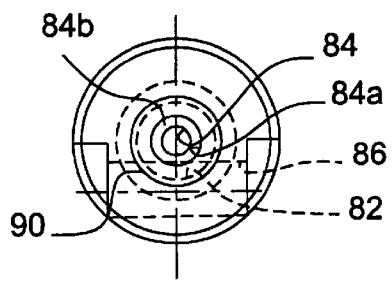
FIG. 12 is a plan view of the valve body of FIG. 10.
Figure 13:
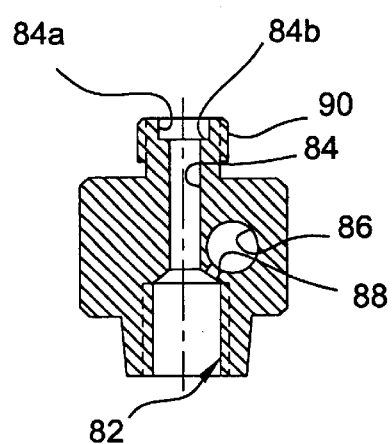
FIG. 13 is a cross-sectional view of the valve body of FIGS. 11 and 12.

Returning now to the valve body 80, as illustrated in FIGS. 11–13, shuttle valve bore 86 extends substantially horizontally through valve body 80, and is coupled to threaded bore 82 by means of the pressure passage, here, bore 88 (see FIG. 13). In order to apply pressure to the cooling system, shuttle valve 102 is received within pressure bore 86. The shuttle valve comprises a central bore 104 that extends axially therethrough. The pressure gauge 74 may be coupled to axial bore 104 at end 102a of the shuttle valve 102 by any appropriate means, so long as adequate sealing is provided. Shuttle valve 102 further comprises radial bore 106 that opens into axial bore 104. It will thus be appreciated by those of skill in the art that when radial bore 106 is aligned with bore 88 of the valve body, axial bore 104 of the shuttle valve 102 is in communication with the cooling system by way of threaded bore 82, and the center bore 43 of shaft 42. In order to seal the shuttle valve 102 within bore 86, O-rings 108, 110, and 112 are received in grooves 114, 116, and 118 along the circumferential surface of the shuttle valve 102 along either side of radial bore 106 and a closed circumferential surface 128.

Travel of the shuttle valve 102 within bore 86 of the valve body 80 is limited by snap rings 120, 122 received in grooves 124, 126 along the circumferential surface of the shuttle valve 102, although alternate travel limiting structure may be provided. In this way, the shuttle valve 102 may be shuttled between an open position and a closed position. The open position is defined by a configuration in which the radial bore 106 is aligned with bore 88 in valve body 80 such that the axial bore 104 of the shuttle valve 102 is in communication with bore 88 of the valve body 80 and, accordingly, center bore 43 of shaft 42 and ultimately with the cooling system. The closed position of the shuttle valve 102 is defined by the circumferential surface 128 of the shuttle valve being in alignment with bore 88 of the valve body 80 such that the axial bore 104 of the shuttle valve is not in communication with the cooling system. It will be appreciated that when the valve assembly 72 is in the open position, the pressure within the cooling system will register on the pressure gauge 74.

In order to couple a source of compressed gas to the cooling system and to supply pressurized gas to test the cooling system, the shuttle valve 102 includes a plurality of barbs 130 along the outer circumferential surface at end 102b. A hose 132 from a source of compressed gas, such as a hand-held pump or a compressor (not shown), may be coupled to the valve assembly 72 by way of end 102b of the shuttle valve 102.

Figure 15:
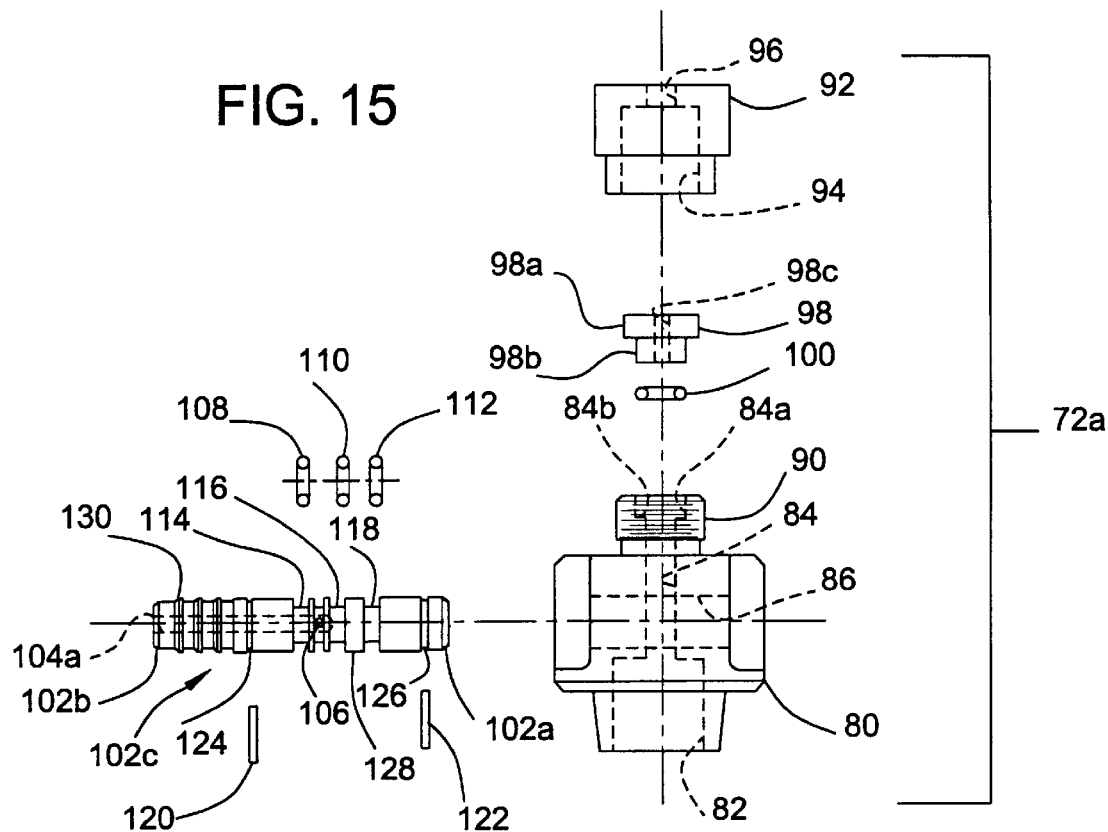
FIG. 15 is an exploded view of an alternate embodiment of the valve assembly of FIGS. 10 and 11.

In the alternate embodiment 72a of the valve illustrated in FIG. 15, the bore 104a does not extend the entire distance through the shuttle valve 102c, but, rather, only to a distance beyond the radial bore 106a. Other than this shorter length bore 106a, the shuttle valve 102c and the valve body 80 in this embodiment are identical to the embodiment illustrated in FIGS. 11–13. As with the first embodiment, pressure source is in communication with the cooling system when radial bore 106a is aligned with bore 88 of the valve body. In this embodiment, however, pressure is read from a pressure gauge (not illustrated) associated with the source of pressurized gas. For example, the pressure may be read directly from gauge associated with a hand pump, as shown in U.S. Pat. No. 5,362,214, coupled to the valve 72a.

Those of skill in the art will appreciate that, in use, the operator must first ensure that the engine has sufficiently cooled to safely remove the radiator cap. The compression knob 54 of the cooling system orifice adapter 30, 70 is rotated outward from the assembly (generally counterclockwise) until all compression has been relieved from the expandable rubber universal fitting 36. The universal fitting 36 is then inserted into the filler neck of the radiator or expansion tank until a step 38 of the universal fitting 36 comes into contact with the interior wall of the filler neck. The compression knob 54 of the cooling system orifice adapter 30, 70 is then rotated (generally clockwise) until the universal fitting 36 comes into firm contact with the interior wall of the filler neck. To test this connection, the operator may grip the cooling system orifice adapter 30, 70 and carefully attempt to pull up on the adapter. The adapter 30, 70 should hold firmly in the filler neck. If necessary, the universal fitting 36 should be further tightened by turning the compression knob 54. It should be noted at this point that some late model vehicles are equipped with radiator tanks and expansion tanks made of plastic. Excessive overtightening of the universal fitting 36 could result in cracking of the radiator tank or expansion tank and, accordingly, caution should be used when tightening the same. Once the cooling system orifice adapter 30, 70 is firmly connected to the radiator filler neck or expansion tank, the safety chain (not shown) may be coupled to the pressure plate 48 by way of the slots 52 and secured along the radiator neck as a safety precaution. In the case of the first embodiment, a radiator pressure tester of standard design may be connected to the cooling system orifice adapter 30 and the cooling system tested using a standard testing device.

Alternately, if the cooling system orifice adapter assembly 70 of the second embodiment is utilized, once coupled and sealed to the radiator neck or expansion tank, a source of compressed gas may be coupled to the valve assembly 72 by means of a tube 132 disposed along the barbs 130 at end 102b of the shuttle valve 102. Note that when the assembly 70 is first coupled to the radiator neck or expansion tank, the pressure and temperate gauges 74, 76 are in place thereon. The shuttle valve 102 may then be advanced into the open position wherein the radial bore 106 is in alignment with bore 88 of the valve body 80 to open communication with the cooling system. Compressed gas is then introduced into the cooling system through the shuttle valve 102 until a desired pressure is attained, as may be read on the pressure gauge 74.

The temperature may likewise be determined at this open position as registered on the temperature gauge 76. Alternatively, the temperature may be measured when the valve assembly 72 is in the closed position, that is, when the closed circumferential surface 128 of the shuttle valve 102 is in alignment with bore 88 of valve body 80. Those of skill in the art will appreciate that in yet another embodiment, bore 84 may be eliminated such that the assembly measures only system pressure. During use, pressure may be added to the system as desired by way of the source of compressed gas.

Once all desired testing is complete, the valve assembly 72 may be moved into the closed position, that is, the shuttle valve 102 may be advanced to the left as illustrated in such FIGS. 10 and 11 that the closed circumferential surface 128 of the shuttle valve 102 is in alignment with the bore 88 of the valve body 80. In releasing the pressurized gas from the cooling system, it is common for some of the hot fluid to be expelled through the testing device. Accordingly, in order to minimize the opportunity for injury as a result of such expulsion of hot liquid or hot gas, the hose, while still connected to the valve assembly, may be disconnected from the source of pressurized gas, and the hose moved to an overflow tank, or other receptacle. The valve assembly 72 may then be advanced to the open position, that is, the shuttle valve 102 may be shuttled to the right as illustrated in FIGS. 10 and 11, and the pressurized gas and/or fluid safely expelled into a designated receptacle without injury to the operator. Once all pressure is released, the compression knob 54 may be rotated to release compression on the expandable universal fitting 36 (generally counterclockwise), the security chain removed, and the radiator adapter 70 disconnected from the cooling system.

While this invention has been described with an emphasis upon preferred embodiments, variations of the preferred embodiments can be used and it is intended that the invention can be practiced otherwise and as specifically described herein. Accordingly, this invention includes all modifications encompassed within the spirit and scope of the invention as defined by the following.

All of the references cited herein, including patents, patent applications, and publications, are hereby incorporated in their entirety.

We claim as our invention:

1. A cooling system orifice adapter for coupling to an orifice and applying pressure from a source of pressurized gas, comprising:
   a hollow shaft having a distal end and a proximal end, and enlarged head portion at the shaft distal end, a threaded length along the shaft, and a central axial bore extending from the distal end to the proximal end,
   a universal fitting having a central axis, a distal end, and a proximal end, an exterior surface comprising a plurality of steps, said steps having substantially axially extending surfaces and substantially radially extending surfaces, said plurality of steps having outermost diameters which increase from the distal end to the proximal end of the universal fitting, at least one of said substantially axially extending surfaces being disposed from the outermost diameter at a negative angle relative to a line parallel to the axis, and an axial bore adapted to receive the hollow shaft, the threaded length along the shaft being at least partially accessible from the proximal end of the universal fitting,
   a plate having a bore extending therethrough adapted to receive the hollow shaft,
   a knob having a threaded internal bore adapted to receive at least a portion of the threaded length of the hollow shaft, the hollow shaft being disposed extending through the fitting axial bore and the plate bore, the enlarged head being disposed adjacent the distal end of the universal fitting and the plate being disposed adjacent the proximal end of the universal fitting, the threaded length of the shaft being received within the knob such that rotation of the knob causes the enlarged head and the plate to exert an axial compression force on the universal fitting between the plate and the enlarged head portion to force the exterior surface of the universal fitting outward to couple the adapter to said orifice, and
   a pressure adapter for coupling the shaft to a source of pressurized gas, the pressure adapter being adapted to sealingly engage the proximal end of the hollow shaft, the pressure adapter further including a pressure passage adapted to be in communication with the central axial bore of the hollow shaft such that pressurized gas may be applied from the source of pressurized gas through the pressure passage and the central axial bore.

2. The cooling system orifice adapter of claim 1, wherein the hollow shaft includes a proximal threaded length, and the pressure adapter includes a threaded coupler for engaging with the proximal threaded length, whereby the hollow shaft, the universal fitting, the plate, the knob, and the pressure adapter are entirely disassembleable such that the hollow shaft, the universal fitting, the plate, the knob, or the pressure adapter may be replaced as desired.

3. The cooling system orifice adapter of claim 2, wherein the pressure adapter further comprises a radiator cup with a bottom, the bottom including the pressure passage.

4. The cooling system orifice adapter of claim 3, wherein the pressure adapter threaded coupler is a nut secured to the bottom.

5. The cooling system orifice adapter of claim 2 wherein the distal end of the hollow shaft includes a structure for engaging a specialized tool for use during disassembly.

6. The cooling system orifice adapter of claim 5 wherein the pressure adapter includes a structure for engaging a second specialized tool for use during disassembly.

7. The cooling system orifice adapter of claim 1, further including a support ring adapted to receive the step of the smallest diameter.

8. The cooling system orifice adapter of claim 1, wherein the plate further includes at least one slot for receiving a chain or other means to redundantly couple the adapter to the orifice.

9. The cooling system orifice adapter of claim 1 wherein the pressure adapter further comprises a valve assembly having a valve body including the pressure passage, the valve assembly further comprising a shuttle valve slidably received in the valve body and moveable between an open position in which the pressure passage is in fluid communication with the source of pressurized gas and a closed position in which the pressure passage is not in fluid communication with the source of pressurized gas.

10. The cooling system orifice adapter of claim 9, wherein the valve body includes a shuttle valve bore and an internally threaded primary bore adapted to receive the threaded length at the proximal end of the hollow shaft, the threaded coupler comprising said internally threaded primary bore, the shuttle valve being slidably received within the shuttle valve bore, the shuttle valve having first and second ends and a central bore extending axially through the shuttle valve, the first end of the valve being in communication with the passage when the shuttle valve is in the open position.

11. The cooling system orifice adapter of claim 10, the pressure adapter further comprising a pressure gauge in fluid communication with the second end of the shuttle valve whereby the pressure gauge measures the pressure applied, the shuttle valve further comprising a radial bore in communication with the shuttle valve central bore and a circumferential surface, the shuttle valve being in an open position when the radial bore is in fluid communication with the pressure passage, and the shuttle valve being in a closed position when the radial bore in not in communication with the pressure passage and the circumferential surface is aligned with the pressure passage.

12. The cooling system orifice adapter of claim 11 further comprising a temperature probe and temperature gauge, the temperature probe being in communication with the central axial bore of the hollow shaft.

13. The cooling system orifice adapter of claim 10 further comprising at least two O-rings disposed about the shuttle valve along either side of the radial bore.

14. The cooling system orifice adapter of claim 13, wherein the shuttle valve includes at least one travel limiter which limits the shuttle valve sliding within the valve body.

15. The cooling system orifice adapter of claim 9, further comprising a temperature probe and temperature gauge, the temperature probe being in communication with the central axial bore of the hollow shaft.

16. The cooling system orifice adapter of claim 1 wherein at least one of the substantially axially extending surfaces in concave.

17. A cooling system orifice adapter for coupling to an orifice and applying pressure from a source of pressurized gas, comprising:
   a hollow haft,
   a universal fitting having a central axis, a distal end, a proximal end, an axial bore for receiving the hollow shaft, and an exterior surface comprising a plurality of steps between the distal end and the proximal end of the fitting, the steps having substantially axially extending surfaces and substantially radially extending surfaces, at least one of said substantially axially extending surfaces being disposed at a negative angle relative to a line parallel to the axis,
   first and second compression members disposed on respective distal and proximal ends of the universal fitting, at least one of said compression members being moveable toward the other compression member to exert an axial compression force on the universal fitting between the compression members to force the exterior surface of the universal fitting outward to couple the adapter to said orifice, and
   a pressure adapter for coupling the shaft to a source of pressurized gas such that pressurized gas may be applied from the source of pressurized gas through the shaft to the cooling system.

18. A cooling system orifice adapter as set forth in claim 17 wherein the negative angle is at least about three degrees.

19. A cooling system orifice adapter as set forth in claim 17 wherein the negative angle is within a range between four and eight degrees.

20. A cooling system orifice adapter as set forth in claim 17 wherein the negative angle is about six degrees.

21. A cooling system orifice as set forth in claim 17 wherein all of the substantially axially extending surfaces of the plurality of steps are disposed at a negative angle relative to a line parallel to the axis.

22. A cooling system orifice adapter for coupling to an orifice and applying pressure from a source of pressurized gas, comprising:
   a hollow shaft having a distal end and a proximal end, and enlarged head portion at the distal end, a threaded length along the shaft, and a central axial bore extending from the distal end to the proximal end,
   a universal fitting having a distal end, a proximal end, an exterior surface having a diameter which increases toward the proximal end, the exterior surface comprising a plurality of steps having graduated diameters, and a axial bore adapted to receive the hollow shaft,
   a compression member having a bore extending therethrough adapted to receive the hollow shaft,
   a knob having a threaded internal bore adapted to receive at least a portion of the threaded length of the hollow shaft, the hollow shaft extending through the bore of the fitting and the bore of the compression member, the enlarge head being disposed adjacent one of the distal end or the proximal end of the universal fitting and the compression member being disposed adjacent the other of the distal end or the proximal end of the universal fitting, the threaded length of the shaft being engageable with the knob such that rotation of the knob causes the enlarged head and the compression member to exert an axial compression force on the universal fitting between the compression member and the enlarged head to force the exterior surface of the universal fitting outward to couple the adapter to said orifice, and
   a pressure adapter for coupling the shaft to a source of pressurized gas, the pressure adapter being adapted to engage the proximal and of the hollow shaft, the pressure adapter further including a pressure passage adapted to communicate with the central axial bore of the hollow shaft such that pressurized gas may be applied from the source of pressurized gas through the pressure passage and the central axial bore,
   wherein the pressure adapter comprises a radiator cup having a bottom including the pressure passage.

\* \* \* \* \*

UNITED STATES PATENT AND TRADEMARK OFFICE
CERTIFICATE OF CORRECTION

PATENT NO. : 6,675,829 B2
DATED : January 13, 2004
INVENTOR(S) : James E. Moore, Jr. et al.

It is certified that error appears in the above-identified patent and that said Letters Patent is hereby corrected as shown below:

<u>Column 12,</u>
Line 56, "communication with the passage" should read -- communication with the source of pressurized gas, the central bore of the shuttle valve being in fluid communication with the pressure passage --.
Line 67, "bore in not" should read -- bore is not --.

<u>Column 14,</u>
Line 27, "enlarge head" should read -- enlarge head --.
Line 41, "proximal and of" should read -- proximal end of --.

Signed and Sealed this

Fifteenth Day of June, 2004

JON W. DUDAS
*Acting Director of the United States Patent and Trademark Office*